May 2, 1961  J. Z. DE LOREAN  2,982,152
TRANSMISSION
Filed April 12, 1956  3 Sheets-Sheet 2

INVENTOR.
JOHN Z. DE LOREAN
BY
ATTORNEYS.

May 2, 1961   J. Z. DE LOREAN   2,982,152
TRANSMISSION
Filed April 12, 1956   3 Sheets-Sheet 3

INVENTOR.
JOHN Z. DELOREAN
BY
ATTORNEYS.

United States Patent Office 2,982,152
Patented May 2, 1961

2,982,152
TRANSMISSION

John Z. De Lorean, Birmingham, Mich., assignor to Studebaker-Packard Corporation, Detroit, Mich., a corporation of Delaware Filed Apr. 12, 1956, Ser. No. 577,705
11 Claims. (Cl. 74—688)

This invention relates to a variable speed automatic transmission, and more particularly it relates to a split drive transmission employing a converter and a fluid coupling in combination with one or more gear reduction systems adapted to provide a plurality of speed ranges. In addition, the transmission provides a highly efficient hydrodynamic braking system for the vehicle under coasting conditions.

Various types of split drive transmissions have been developed in the past utilizing a torque converter or a pair of fluid couplings connected is series with a gear set. However, under actual test conditions, these prior arrangements have proven to be relatively inefficient in their operation and, in addition, it has been found that economy of design is frequently sacrificed in order to obtain smoothness in the transition between the various driving ranges and other desirable operating characteristics.

In order to overcome these difficulties, the applicant has devised a new type of differential drive transmission which is particularly adapted for use in conjunction with modern types of high powered engines. In addition to being efficient in its operation through a wide range of driving conditions, it is also designed to provide the ultimate in smoothness of operation. Further, the applicant's new transmission is adapted to provide an efficient hydrodynamic coast braking system for the rear wheels of the vehicle, which may be selectively engaged by the vehicle operator. This latter feature is obtained by utilizing the fluid coupling to brake the speed of rotation of the converter impeller, and the latter effectively brakes the speed of rotation of the converter turbine and the rear wheels of the vehicle.

Other advantages and important features of the applicant's new transmission will be apparent upon reading the following specification together with the accompanying drawings in which.

Figure 1:
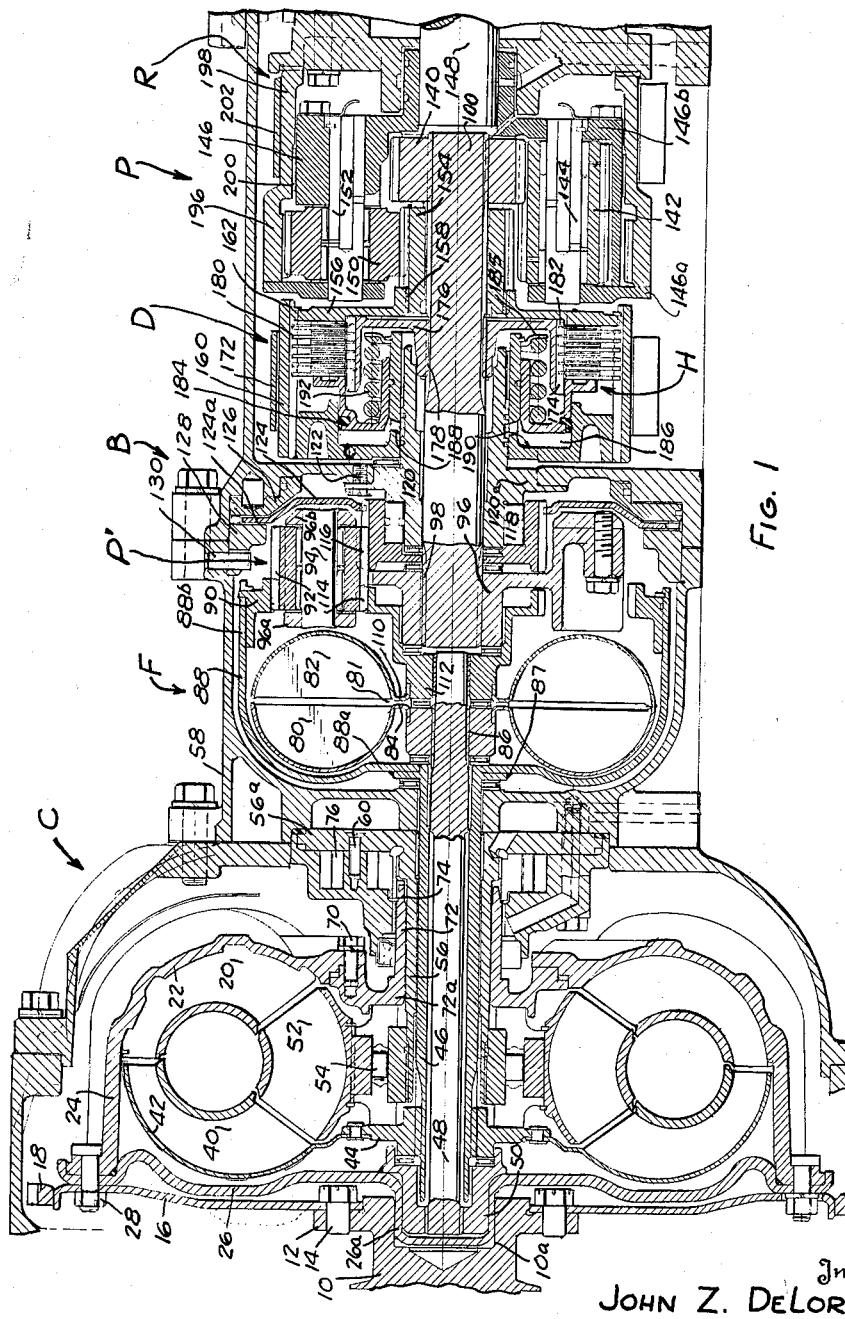
Figure 1 is a sectional side view, partly broken away, of the transmission.

Referring to Figure 1, there is disclosed a split drive automatic transmission including a torque converter C, a fluid coupling F, a forward gear set P' and a main planetary gear reduction system P. It will be appreciated that other gear systems may be utilized in conjunction with the applicant's transmission than that shown, and the gear systems subsequently to be described in detail should be considered only as illustrative and not as limiting the scope of the invention. Further, it will be appreciated that the applicant's transmission may be adapted for use with a single gear reduction system; i.e., for example, the forward gear set P'.

As shown in Figure 1, an engine driven input shaft 10 has a flanged portion 12 formed at one end thereof, which is secured by screws 14 to an annular flywheel 16 of stamped construction. An annular externally toothed gear ring 18 mounted about the outer periphery of flywheel 16 is utilized for the purpose of cranking the engine. The converter C has a fluid energizing impeller 20 having an outer shell 22. The outer shell 22 is formed integral with a skirt 24 which is secured to the flywheel 16 and to an inwardly facing end wall 26 of the converter, by screw means 28. The converter end wall 26 has a cup shaped axial portion 26a which is fixedly mounted within an axial bore 10a formed in the adjacent end of the input shaft 10.

The converter C also includes a turbine member 40 positioned adjacent impeller 20 having an outer shell 42 which is connected by radial element 44 with a sleeve 46. The sleeve 46 is rotatably supported about a shaft 48 disposed substantially in axial alignment with input shaft 10. Shaft 48 is drivingly connected with input shaft 10 by means of a collar 50 splined thereto, and which is fixedly mounted within the cup shaped axial portion 26a in the converter end wall 26 by means such as welding.

The converter C also includes a reactor member 52 which is disposed between the turbine member 40 and the impeller 20. The reactor 52 is connected by a one-way clutch mechanism indicated at 54, with a sleeve 56 supported about the sleeve 46. Sleeve 56 has a radial portion 56a formed in its rearward end, which is fixedly connected to the transmission casing 58 by suitable means, such as screw 60. The one-way clutch mechansim 54 may be any one of several designs well known to those skilled in the art, and its purpose is to hold reactor member 52 against rotation in a reverse direction with respect to the normal direction of rotation of impeller 20.

The outer shell 22 of impeller member 20, as above described, is connected at one end to a skirt 24, and at its other end is connected by bolt 70 to a flanged portion 72a of a collar 72 which is rotatably supported about sleeve 56. Collar 72 has an annular gear means 74 formed about its rearward end which is adapted to drive a front gear pump 76. The front pump 76 is secured to the transmission casing 58 by bolt 60 and serves to provide fluid pressure required for the operation of the transmission and its associated control system, subsequently to be described in detail.

Cooperating with the impeller 20 is a fluid coupling F which includes a driving runner 80 and a driven runner 82. The driving runner 80 has an inwardly extending radial element 84 formed integral therewith, which is splined to shaft 48 as indicated at 86. The rearward end of the turbine driven inner sleeve 46 is provided with a flange that is welded, as indicated at 87, to a radially extending portion 88a of an annular member 88 which extends about the fluid coupling F and serves as an outer fluid retaining casing therefor. The rearward end 88b of the annular member 88 is drivingly connected with an annular internally toothed driving ring gear 90 which is adapted to mesh with a pinion gear 92 of the front gear set P'. Pinion 92 is rotatably supported by pinion shaft 94 which is carried between the end walls 96a and 96b of a carrier member 96. The carrier member 96 is splined as indicated at 98 to the forward end of an intermediate shaft 100, which is disposed substantially in axial alignment with input shaft 10 and shaft 48. The form of the carrier member 96 may be of various designs apparent to those skilled in the art, and its particular construction does not constitute a part of this invention. A similar carrier arrangement is described in my copending application, Serial No. 560,201, filed January 19, 1956.

The driven runner 82 of the coupling F also has an inwardly extending radial portion 110, which is drivingly connected with a hub 112 rotatably supported about the rearward end of shaft 48. A first sun gear 114 is formed integral with hub 112 and is adapted to mesh with pinion 92. A second sun gear 116 is also adapted to mesh with pinion 92. The second sun gear 116 is rotatably supported by means of a one-way brake mechanism 118 carried by a hub 120 having a radially extending flanged portion 120a which is fixedly connected to the transmission casing 58 by screws 122. The one-way brake 118 may be of any conventional design, and serves to hold sun gear 116 against rotation in one direction. The function of the one-way brake mechanism 118 will subsequently be described in detail in connection with the description of operation of the transmission.

The second sun gear 116 is also connected by a radially extending element 124 having an outer annular end portion 124a which serves as a friction clutch element for the coast brake mechanism indicated generally at B. The annular end portion 124a extends between a hydraulically operated piston 126 and annular clutch member 128; the latter being fixedly connected to the transmission casing 58 by suitable means, such as by pin 130. The piston 126 is moved by fluid pressure admitted to the rearwardly facing side thereof, into engagement with the outer end 124a of the radial element 124, and the latter is held against rotation by frictional engagement with the annular clutch member 128. Thus, it will be seen that ring gear 116 may be selectively held against rotation by the operation of the coast brake B. It will be appreciated that fluid pressure may be admitted to the rearward side of piston 126 through conventional fluid passageways (not shown) formed within the transmission casing. The operation of the coast brake B and the control mechanism for operating the latter will subsequently be described in detail.

The main planetary gear system P includes a driving sun gear 140 which is splined to the rearward end of the intermediate shaft 100. The driving sun gear 140 meshes with a long pinion 142, shown only in the lower half of the drawing, which is rotatably supported about a pinion shaft 144. Shaft 144 is supported between end walls 146a and 146b of a carrier member 146, and the latter in turn is fixedly mounted to a transmission output shaft 148.

Figure 2:
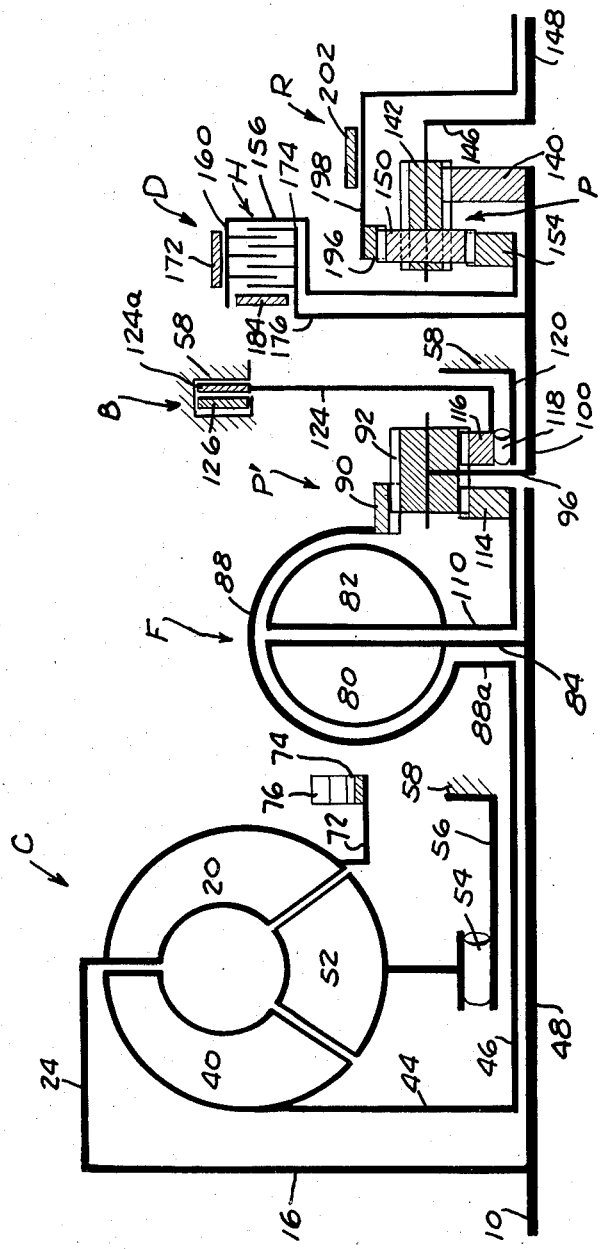
Figure 2 is a schematic side elevation of the transmission shown in Figure 1.

As shown in Figure 2, the long pinion 142 meshes with a short pinion 150 of larger diameter which is rotatably supported on a pinion shaft 152 mounted between end walls 146a and 146b of carrier member 146. For the purpose of simplifying the drawing, only one long pinion 142 and one short pinion 150 are shown, and it will be appreciated that three or more long and short pinions may be rotatably supported by the carrier member 146, as is the conventional practice in the art. To further simplify the drawing, the long pinions 142 are shown as meshing with the short pinions 150, only in the schematic view of the transmission disclosed in Figure 2.

The short pinion 150 is also adapted to mesh with a reaction sun gear 154 rotatably supported about the intermediate shaft 100, adjacent the driving sun gear 140. A radially extending annular element 156 is splined to the forward end of the reaction sun gear 154, as indicated at 158. The outer periphery of radial element 156 is splined to an annular brake drum 160, and is held in position with respect thereto by snap ring 162. A low range brake band 172 is adapted to engage the outer surface of drum 160 to thereby hold the reaction sun gear 154 against rotation. Brake band 172 forms a part of the low range brake mechanism indicated generally at D in the drawing, and the details of its operation, as well as the control mechanism for operating same, will subsequently be described in detail.

A high range clutch, indicated generally at H, includes an inner annular drum 174 which is concentrically disposed with respect to the outer drum 160. The inner drum 174 has an inwardly extending radial portion 176 which is splined to the intermediate shaft 100, as indicated at 178. Annular friction disc members 180 are externally splined to the outer drum 160, and are alternately interposed between annular clutch disc members 182, which are internally splined to the inner drum 174 in the conventional manner. An annular piston 184 is slidably mounted in a piston chamber 186, formed within a housing end wall 190, which is rotatably supported about the rearward end of hub 120. When fluid pressure is admitted to piston chamber 186 through passageway 188, piston 184 is moved into engagement with clutch disc members 180 and 182, and as a result the reaction sun gear 154 is drivingly connected with the intermediate shaft 100. The passageway 188 connects with the hydraulic control system, which will subsequently be described in detail, in connection with Figure 3. A coil spring 192 is retained between piston 184 and a snap ring 185 carried by one of the walls forming chamber 186, and spring 192 serves to move piston 184 out of engagement with clutch disc members 180 and 182 when chamber 186 is exhausted of fluid, thereby disengaging reaction sun gear 154 from the intermediate shaft 100.

An annular, internally toothed, reverse ring gear 196 is disposed about the main planetary gear system P, and is adapted to mesh with short pinion 150. The reverse ring gear 196 is formed integral with the rearwardly extending drum 198 which is rotatably supported about carrier member 146, by bushing means 200. A reverse brake band 202 is adapted to engage and hold drum 198 and reverse ring gear 196 against rotation. The operation of the reverse brake mechanism R will subsequently be described in detail.

To enable the reader to better understand the following description of the operation of the transmission described above, reference may be had to Figure 2 which discloses a schematic view of the essential details of the transmission shown in Figure 1. Also, for the reader's convenience, a chart indicating the sequence of operation of the brakes and clutches in the different driving ranges is set forth below.

|  | Coupling | Coast Brake | Low Range Brake | High Range Clutch | Reverse |
| --- | --- | --- | --- | --- | --- |
| Manual Low Drive | Exhaust | On | On | Off | Off. |
| Low | Exhaust | Off | On | Off | Off. |
| Intermediate | Filled | Off | On | Off | Off. |
| High | Filled | Off | Off | On | Off. |
| Kickdown | Filled | On | On | Off | Off. |
| Hydrodynamic Braking | Filled | On | On/Off | Off/On | Off. |
| Reverse | Exhaust/Filled | Off | Off | Off | On. |

In the normal sequence of operations, when starting from a standstill, the low range brake D is engaged, holding reaction sun gear 154 against rotation, the high range clutch H, the coast brake B and the reverse band R are disengaged, and coupling F is exhausted of fluid. As engine torque is delivered to input shaft 10, impeller 20 drives the converter turbine 40, which in turn drives the driving ring gear 90, through sleeve 46, and the annular member 88. Ring gear 90 drives pinion 92 of the front gear set P', and pinion 92 is walked about the second sun gear 166, which is held against a reverse rotation in respect thereto, by the one-way brake mechanism 118. At the same time the first sun gear 114 is permitted to rotate freely, since no engine torque is delivered through the coupling F.

As pinion 92 is walked about sun gear 116, carrier member 96 drives intermediate shaft 100 in the same direction as input shaft 10 in low gear ratio. Thus, the driving sun gear 140 carried by the intermediate shaft 100, drives long pinion 142, which in turn drives short pinion 150, and the latter is walked about the held reaction sun gear 154. As a result, carrier member 146 and output shaft 148 are driven in a forward direction in a compounded low gear range; gear reduction then being provided by both the front gear set P' and the main planetary gear system P. In addition, torque multiplication is also provided by the converter C, until such time as its turbine member 40 approaches the speed of rotation of impeller 20, and reactor member 52 is lifted off the one-way clutch mechanism 54 and rotated at substantially the same speed therewith. Under these conditions, the converter C commences to operate as a fluid coupling and thus no longer provides any torque multiplication. In this connection, it will be appreciated that if the torque multiplication provided by the converter C is not desired, a conventional type fluid coupling may be utilized in the present transmission in place of the converter, in a manner apparent to those familiar with the art.

To condition the transmission to operate in the next highest or intermediate driving speed ratio, means are provided whereby the fluid coupling F is automatically filled with fluid. As a result, the driven coupling runner 80, which is driven by input shaft 10 and shaft 48, commences to drive the driven runner 82, and the latter in turn drives the first sun gear 114 of the front gear set P'. As sun gear 114 approaches the speed of rotation of driving ring gear 90 (substantially at a 1:1 ratio with input shaft 10), pinion gear 92 is locked against rotation and, thus, carrier member 96 drives the intermediate shaft 100 at a 1:1 ratio with the engine. As a result, sun gear 140 of the main planetary gear system P drives the long pinion 142 and short pinion 150 at an increased speed, thereby driving the output shaft 148 at an intermediate speed ratio; gear reduction then being provided only by the main planetary gears P.

In order to obtain direct or high range drive, the high range clutch H is engaged, and the low range brake D is disengaged, thereby driving the reaction sun gear 154 with intermediate shaft 100. In all other respects the controls remain the same as in low and intermediate range. Under these conditions, both reaction sun gear 154 and driving sun gear 140 of the main planetary gear system P are driven at the same speed as intermediate shaft 100, with the result that pinion gears 142 and 150 are locked, and the carrier member 146 and output shaft 148 are driven at substantially a 1:1 ratio with input shaft 10 and intermediate shaft 100, respectively.

In order to obtain a rapid increase in gear ratio while operating in high range drive, as for example when the vehicle operator wishes to pass another car, the high range clutch H may be disengaged and the low range brake D engaged. The transmission is then conditioned to operate in an intermediate speed range in the manner as described above. If desired, a further gear reduction may be provided by rapidly exhausting the fluid coupling F of fluid, thereby effecting an increase in the gear ratio through the front gear set P'. It will be appreciated that depending upon the desired characteristics of the kickdown to a lower gear ratio, a sudden increase in the gear ratio while operating in high range drive may be obtained by simply exhausting the fluid coupling F of fluid, while maintaining the direct or high range drive through the main planetary gear system P. Another alternative to the above described kickdown arrangement would be to adapt the control system to exhaust the coupling when operating the coupling above a predetermined relatively high speed and, in addition, to exhaust the coupling as well as to engage the low range brake on the main planetary system when the vehicle is operating below a predetermined relatively low speed. Thus, it will be apparent that the above described kickdown arrangement is subject to various modifications, and it is to be understood that the system described is for the purpose of illustration only. Further, as is well known to those familiar with the art, the controls required for a transition to a lower speed ratio may be of various designs. For example, it is conventional practice to arrange the controls so that when the vehicle accelerator is depressed beyond its maximum throttle position, the low range brake D is engaged and the coupling F exhausted of fluid by a mechanical or hydraulic means. An example of such a control arrangement is described in detail in the McFarland et al. application, assigned Serial No. 498,404, filed March 31, 1955.

One of the outstanding features of the applicant's new transmission is that it may be conditioned to provide hydrodynamic braking for the rear wheels of the vehicle by engaging the coast brake B. Normally the coast brake is applied while the transmission is operating, in low range, and the obvious advantage of this arrangement is that the increased gear ratio provided by the front gear set P' and the main planetary gear system P (when overdriven by the rear wheels of the vehicle), substantially increases the efficiency of the coast braking next to be described. It will be appreciated, however, that the coast brake B may be operated in any of the forward driving speed ranges.

When the coast brake B is applied and the transmission is conditioned to operate in low range drive (the low range brake D is engaged and the high range clutch H is disengaged) output shaft 148 is overdriven by the rear wheels of the vehicle under coasting conditions. Thus, long pinion 142 tends to overdrive driving sun gear 140 and intermediate shaft 100. The intermediate shaft in turn rotates the carrier member 96 of the front gear set P', and pinion 92 tends to walk about the held second sun gear 116, which is then held by coast brake B. As pinion 92 is walked about the second sun gear 116, driving ring gear 90 and the converter turbine member 40 are overdriven, and at the same time the first sun gear 114 is driven in a reverse direction, which in turn drives the normally driven coupling runner 82 in a reverse direction. When coupling F is filled with fluid, it will be seen that a high degree of braking action occurs between driven runner 82 and driving runner 80; the latter being driven in a forward direction by input shaft 10, and thus, the speed of rotation of input shaft 10, the converter impeller 20 and the associated vehicle engine are rapidly reduced to a near idling speed. Under these conditions an efficient braking action occurs in the converter C due to the relatively high differential in the speeds of rotation of the near idling converter impeller 20 and the overdriven turbine 40, and as a result the speed of rotation of the output shaft 148 and the rear wheels of the vehicle are braked.

Under certain condtions it may be desirable to operate the transmission in manual low, and to accomplish this the controls are operated similarly to the previously described normal drive operation in a low speed ratio, except, however, that the coast brake B is engaged. (See clutch sequence chart.) Under these conditions, the output shaft 148 is driven in a forward direction in a compounded low gear ratio provided by both the front gear set P' and the main planetary gear system P. Since the second sun gear 116 of the front gear set P' is then held against rotation by the coast brake B, a geared drive is maintained between output shaft 148 and input shaft 10. Thus, for example, if while in manual low the vehicle is descending a relatively steep incline, the rear wheels of the vehicle cannot overdrive the transmission and thus lift the second sun gear 116 off the one-way brake mechanism 118, and as a result the vehicle engine, as well as the gear ratio provided by the transmission, may be utilized to brake the vehicle.

To condition the transmission to operate in reverse drive, the reverse band 202 is applied to drum 198 of the main planetary gears P, thereby holding the reverse ring gear 196 against rotation. When the coupling F is exhausted of fluid, and the low band 172 is disengaged from drum 160, and the high range clutch H and coast brake B are rendered inoperative, the intermediate shaft 100 is driven at a reduced gear ratio through the front gear set P'. The intermediate shaft 100 drives sun gear 140, the latter drives long pinion 142, which in turn drives short pinion 150. The short pinion 150 is thus caused to walk about the held reverse ring gear 196, while the reaction sun gear 154 is permitted to rotate freely. As the pinion 150 is walked about reverse ring gear 196, the carrier member 146 is rotated in a reverse direction, driving with it the output shaft 148 in a reverse direction, in a low speed ratio. Under these condtions, it will be seen that gear reduction is provided by both the front gear set P' and the main planetary gears P, and if desired the gear reduction provided by the front gear set P' may be eliminated. This, of course, may be accomplished by filling coupling F with fluid, and since both the driving ring gear 90 and the first ring gear 114 are then driven at substantially the same speed, the intermediate shaft 100 is driven at a 1:1 ratio with input shaft 10 by carrier member 96. Accordingly, it will be seen that the one of the advantages of the applicant's transmission is that an increased speed ratio may be obtained in reverse drive, if desired.

With reference to the above description, it will be seen that the applicant's new transmission provides a split drive in high range. As a result, the coupling F is normally utilized to transmit engine torque only at higher speeds, at which point the coupling operates most efficiently. In addition, as previously pointed out, at higher speeds, the converter C operates at its theoretical coupling point. Thus, a substantially 1:1 drive ratio is obtained through both fluid driving members in high speed range, where maximum economy of operation is most desired.

In this respect, it has been found that for the most efficient operation of the transmission while in high range split drive, it is preferable to adapt the coupling F to transmit a smaller proportion of the engine torque than the converter C. For example, the coupling may be adapted to carry one-third of the engine torque and the converter the remaining two-thirds, when the transmission is operating in high range. It will be appreciated, however, that this torque split relationship between the converter and coupling may be modified to provide different characteristics in the transmission operation, and that the coupling may be adapted to carry 50% of the engine torque split in high range, if desired.

A further advantage of the applicant's transmission is that in low and intermediate driving ranges the front gear set P' provides a gear reduction drive to the main planetary gear system P. As a result, the inherent inefficiency of the converter C, due to slippage between its turbine and impeller members, is substantially reduced from that normally expected if the converter turbine were directly connected with the main planetary gears.

It is to be understood that other types of fluid driving means, well known to those familiar with the art, may be utilized in place of converter C and coupling F; for example, a fluid coupling may be used in place of converter C in the present transmission. Also, if will be appreciated that other well known types of selectively operable clutch or brake means may be used in place of coupling F to drivingly connect input shaft 10 with the first sun gear 114 of the front gear set P'.

*Transmission controls*

The following is a description of a portion of the control system utilized for operating the above transmission. It will be noted that it is similar, except in a few minor details, to the control system described in the copending McFarland et al. application, Serial No. 498,404, filed March 31, 1955. For the purpose of simplifying the specification, the following description, read in conjunction with Figure 3, is limited to the distinguishing features of the present control system.

Figure 3:
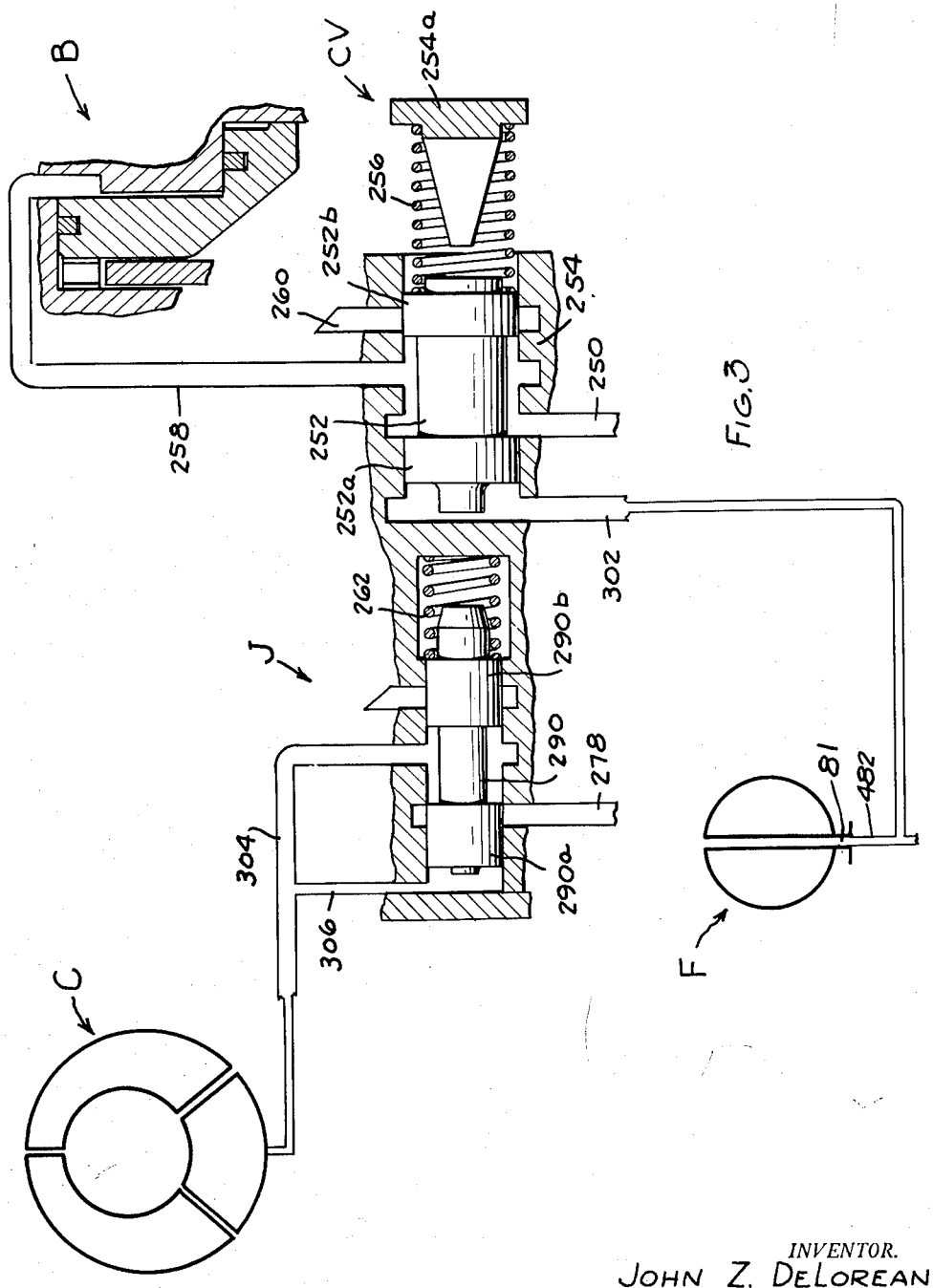
Figure 3 is a schematic view of a portion of the control system for operating the transmission.

As shown in Figures 1 and 3, the fluid coupling F has inlet port 81 connecting with pressure conduit 482, which corresponds to conduit 482 connecting with the direct drive clutch of the McFarland et al. control system cited above. Conduit 482 is connected by branch conduit 302 with the left hand end of a coast clutch valve CV. The coast clutch valve CV includes a valve member 252 having two lands of equal diameter, 252a and 252b, formed near the opposite ends thereof. The valve member 252 is reciprocally mounted within a housing 254 and a coil spring 256 is interposed between the right hand end of the valve member and the right hand end wall 254a of the valve housing. The spring 256 tends to urge valve member 252 to its left hand position, wherein land 252a uncovers fluid pressure inlet conduit 250, and the fluid pressure flowing therefrom is permitted to flow between the lands to conduit 258 connecting with coast clutch B. At the same time, land 252b covers vent port 260 connecting with the sump. Inlet conduit 250 connects with a pressure conduit (not shown) which is indicated by reference numeral 432 in the McFarland et al. system cited above, and this latter conduit in turn communicates with the operative side of the low range brake and inducts fluid thereto at all times when the transmission is conditioned to operate in a forward driving range.

When fluid pressure is admitted to line 482 to fill the coupling F, and to thereby engage high range drive, branch conduit 302 conducts fluid pressure to the left hand side of valve member 252 and the latter is thereby moved to the right against the action of spring 256. When valve member 252 is in its right hand position, it will be seen that land 252a covers pressure inlet conduit 250 and land 252b uncovers vent port 260, thereby permitting fluid pressure in the coast clutch B to be vented through line 258, and thence through vent port 260 to the sump. Thus, it will be seen that whenever the coupling F is filled with fluid, the coast clutch is rendered inoperative. Also, coast clutch B is engaged whenever the coupling inlet line 482 is exhausted of fluid, and fluid pressure is admitted to the operative side of the low range brake (not shown). It will be appreciated that the sequence of operation may be varied or modified to obtain different sequences of operation in the transmission clutches and that the form of the cost clutch valve CV is given only for the purpose of illustrating a typical control arrangement for automatically controlling the operation of coast clutch B.

The converter valve, which is identified by the letter J, is similar to the converter valve described in the McFarland et al. application, except that a coil spring 262 is adapted to normally urge converter valve member 290 to the left, thereby permitting pump regulator valve pressure, admitted to conduit 278, to flow between lands 290a and 290b to line 304, and thence to converter C. Pressure from line 304 is also admitted to passageway 306 to the left side of valve member 290, thereby tending to move the latter to the right against the action of spring 262. When valve member 290 is moved towards the right, land 290a tends to cover inlet conduit 278, with the result that a reduced flow of pressure is delivered to converter line 304. Thus, it will be seen that converter valve J serves precisely the same function as the converter valve in the McFarland et al. application; that is, it is adapted to limit the fluid pressure admitted to converter C, and the maximum pressure permitted to flow therethrough is determined by the force exerted by spring 262.

In all other respects, the transmission controls for operating the present transmission may be identical to that described in the McFarland et al. copending application cited above, and further description thereof is not believed to be necessary. However, it will be appreciated that other types of control systems, apparent to those skilled in the art, may be utilized to operate the present transmission. Further, it will be understood that the applicant's transmission may be modified in various ways apparent to those familiar with the art. Therefore, the following claims should not be considered as limited to the details of construction and arrangement of parts illustrated and described in the specification, since the invention is capable of other embodiments and of being practiced or carried out in various ways.

I claim:

1. A variable speed transmission comprising a fluid torque converter having impeller and turbine members, a fluid coupling having driving and driven runners, a first gear reduction system including a carrier member, a driven shaft drivingly connected with said carrier member, at least one pinion gear rotatably supported by said carrier member, a driving ring gear meshing with said pinion gear, an input element drivingly connected with the converter impeller member and the driving coupling runner, a sleeve rotatably supported about said input element which is drivingly connected with said turbine member, means adapted to surround and form a housing for the coupling for drivingly connecting said sleeve with said driving ring gear, a first sun gear meshing with said pinion gear, means for drivingly connecting the driven coupling runner with said first sun gear, a second sun gear rotatably meshing with said pinion gear, one-way brake means to hold said second sun gear against rotation in one direction, a first actuatable means to hold said sun gear against rotation in either direction, and a second actuatable fluid pressure means to fill and exhaust the fluid coupling of fluid.

2. A transmission as described in claim 1 including a second gear reduction system connecting with said driven shaft for providing a plurality of compounding gear ratios.

3. A transmission as described in claim 1 including a second gear reduction system having a driving sun gear fixedly mounted on said driven shaft, a reaction sun gear rotatably supported on said driven shaft, a carrier member, an output shaft connecting with said carrier member, a first pinion gear rotatably supported by said carrier member and meshing with said driving sun gear, a second pinion gear rotatably supported by said carrier member meshing with said first pinion gear and said reaction sun gear, a third selectively actuatable means to hold said reaction sun gear against rotation and a fourth selectively actuatable means to drivingly connect the reaction sun gear with said driven shaft.

4. A variable speed transmission comprising a fluid torque converter having impeller and turbine members, a fluid coupling having driving and driven runners, a gear reduction system including first and second driving gear means, an output shaft drivingly connected with said gear reduction system, an input shaft drivingly connected with said impeller converter member and driving coupling runner, a sleeve rotatably supported about the input shaft drivingly connected with the converter turbine member, and housing means for enclosing the fluid coupling and for drivingly connecting said sleeve with said first driving gear means and means for drivingly connecting the driven coupling runner with the second driving gear means, and actuatable fluid pressure means for filling and exhausting the coupling of fluid.

5. A variable speed transmission comprising a fluid torque converter having impeller and turbine members, a fluid coupling having driving and driven runners, a first gear reduction system including first and second driving gear means, a driven shaft drivingly connected with said gear reduction system, an input shaft drivingly connected with said impeller converter member and driving coupling runner, a sleeve rotatably supported about the input shaft drivingly connected with the converter turbine member, and housing means for enclosing the fluid coupling and for drivingly connecting said sleeve with said first driving gear means, and means for drivingly connecting the driven coupling runner with the second driving gear means, a second gear reduction system including a driving sun gear carried by said driven shaft, a pinion carrier, a pinion gear rotatably supported by the carrier member and meshing with said driving sun gear, a second pinion gear of larger diameter, rotatably supported by the carrier member and meshing with said first pinion gear, a reaction sun gear rotatably supported about said driven shaft and meshing with said second pinion gear, and an output shaft connecting with the carrier member, a first selectively operable means for holding said reaction sun gear against rotation, a second selectively actuatable means for drivingly connecting the reaction sun gear with said driven shaft, a third selectively actuatable fluid pressure means for filling and exhausting the coupling of fluid, and a fourth selectively operable means to condition the first gear reduction system to drive the driven coupling runner in a reverse direction to the direction of rotation of the driving coupling runner when said output shaft is overdriven, thereby to hydrodynamically brake the speed of rotation of the driving coupling runner and input shaft, when the coupling is filled with fluid.

6. A transmission comprising a fluid torque converter having impeller, turbine and reactor members, a fluid coupling having driving and driven runners, a first gear reduction system including a pinion carrier, an intermediate shaft driven by said carrier, a pinion gear rotatably supported by the carrier, a driving ring gear meshing with said pinion gear, a first sun gear rotatably supported about the intermediate shaft drivingly connected to said driven coupling runner and meshing with the pinion gear, a second sun gear rotatably supported about the intermediate shaft and meshing with the pinion gear, an input shaft drivingly connecting with said converter impeller member and said driven coupling runner, a sleeve rotatably supported about the input shaft driven by said turbine member, a casing member enclosing said fluid coupling, and drivingly connecting said sleeve and said driving ring gear, one-way clutch means supported about said sleeve for holding said converter reactor member against rotation in one direction, one-way brake means to hold said second sun gear against rotation in one direction, a first selectively operable means to hold said sun gear against rotation in either direction, a second selectively operable fluid pressure means to fill and exhaust the coupling of fluid, a second gear reduction system including a driving sun gear fixedly connected to the intermediate shaft, a carrier member, an output shaft driven by the carrier member, a first pinion gear rotatably supported by the carrier member and meshing with said driving sun gear, a second pinion gear rotatably supported by said carrier member meshing with said first pinion gear, a reaction sun gear rotatably supported about said intermediate shaft and meshing with said second pinion gear, a third selectively operable means to hold said reaction sun gear against rotation, a fourth selectively operable means to drivingly connect said reaction sun gear with said intermediate shaft, a reverse ring gear meshing with said second pinion gear, and a fifth selectively operable reverse brake means for holding said ring gear against rotation, whereby said last mentioned carrier member and output shaft are rotated in a reverse direction, when said driving sun gear is driven.

7. A variable speed transmission comprising a converter driving member, a converter driven member, a fluid coupling having a driving runner connected to said converter driven member and a driven runner, reversing gear means disposed between said converter driven member and said driven runner, selectively operable means for controlling said gear means to effect rotation of said driven runner in an opposite direction relative to said driven converter member.

8. A transmission as described in claim 7 wherein selectively operable means are provided for filling and emptying said fluid coupling.

9. A variable speed transmission comprising a driving member, a driven member drivable by said driving member, a driven shaft connected to said driven member, a fluid coupling having a driving runner connected to said driving member and a driven runner, planetary gear means, including brake means therefor, disposed between said driven shaft and said driven runner for selectively rotating said driven runner in an opposite direction relative to said driven shaft, said planetary gear means having one rotatable element thereof which conditions the gear means to rotate said driven runner in the opposite direction of said driven shaft when said rotatable element is in a braked position.

10. A transmission as described in claim 9 wherein said brake means is selectively operable.

11. A transmission as described in claim 9 wherein selectively operable means are provided for filling and emptying said fluid coupling.

References Cited in the file of this patent
UNITED STATES PATENTS

| | | |
|---|---|---|
| 2,312,849 | Pollard | Mar. 2, 1943 |
| 2,351,213 | James | June 13, 1944 |
| 2,454,014 | Seybold | Nov. 16, 1948 |
| 2,687,657 | Kugel et al. | Aug. 31, 1954 |
| 2,693,260 | Lucia | Nov. 2, 1954 |
| 2,695,533 | Pollard | Nov. 30, 1954 |